United States Patent
Humfeld

(10) Patent No.: US 10,096,396 B2
(45) Date of Patent: Oct. 9, 2018

(54) COMPOSITE MATERIALS WITH IMPROVED ELECTRICAL CONDUCTIVITY AND METHODS OF MANUFACTURE THEREOF

(71) Applicant: The Boeing Company, Chicago, IL (US)

(72) Inventor: Keith Daniel Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 288 days.

(21) Appl. No.: 14/468,227

(22) Filed: Aug. 25, 2014

(65) Prior Publication Data
US 2016/0055930 A1 Feb. 25, 2016

(51) Int. Cl.
*H01B 1/22* (2006.01)
*B32B 3/12* (2006.01)
(Continued)

(52) U.S. Cl.
CPC .............. *H01B 1/22* (2013.01); *B29C 70/882* (2013.01); *B32B 3/12* (2013.01); *B32B 5/024* (2013.01);
(Continued)

(58) Field of Classification Search
CPC ......... H01B 1/22; B29C 70/882; B29C 70/14; B29C 70/62; B32B 3/12; B32B 5/024; B32B 5/26; B32B 2260/021; B32B 2262/106; B32B 2264/105; B32B 2307/202; B32B 2307/208; B32B 2309/025; B32B 2419/00; B32B 2605/00; B29D 99/001; B29L 2031/3076; B64D 45/02
(Continued)

(56) References Cited

U.S. PATENT DOCUMENTS

| | | | |
|---|---|---|---|
| 6,741,019 B1 * | 5/2004 | Filas | H01J 1/304 313/309 |
| 7,947,773 B2 | 5/2011 | Hansen et al. | |

(Continued)

FOREIGN PATENT DOCUMENTS

| | | |
|---|---|---|
| CN | 102112534 A | 6/2011 |
| EP | 2546924 A1 | 1/2013 |

(Continued)

OTHER PUBLICATIONS

European Patent Office, European Search Report in European Patent Application No. 15170683.5-1703, dated Feb. 8, 2016, 10 pages.
(Continued)

*Primary Examiner* — Harold Pyon
*Assistant Examiner* — Danny N Kang
(74) *Attorney, Agent, or Firm* — Kolisch Hartwell, P.C.

(57) ABSTRACT

A method of manufacturing a composite material may include providing one or more layers of reinforcement material penetrated with viscous matrix material that is doped with electrically conductive particles. The method may further include applying a magnetic field to arrange the particles into one or more electrically conductive pathways, and curing the matrix material to secure the pathways in position relative to the reinforcement material.

20 Claims, 7 Drawing Sheets

(51) Int. Cl.
| | |
|---|---|
| B29C 70/88 | (2006.01) |
| B32B 5/02 | (2006.01) |
| B32B 5/26 | (2006.01) |
| B29L 31/30 | (2006.01) |
| B29C 70/62 | (2006.01) |
| B29D 99/00 | (2010.01) |
| B29C 70/14 | (2006.01) |
| B64D 45/02 | (2006.01) |

(52) U.S. Cl.
CPC .............. *B32B 5/26* (2013.01); *B29C 70/14* (2013.01); *B29C 70/62* (2013.01); *B29D 99/001* (2013.01); *B29L 2031/3076* (2013.01); *B32B 2260/021* (2013.01); *B32B 2262/101* (2013.01); *B32B 2262/106* (2013.01); *B32B 2264/105* (2013.01); *B32B 2307/202* (2013.01); *B32B 2307/208* (2013.01); *B32B 2309/025* (2013.01); *B32B 2419/00* (2013.01); *B32B 2605/00* (2013.01); *B64D 45/02* (2013.01)

(58) Field of Classification Search
USPC ........................................................ 252/500
See application file for complete search history.

(56) References Cited

U.S. PATENT DOCUMENTS

| 8,071,171 B1* | 12/2011 | Doty | ................... | B29C 37/0085 |
|---|---|---|---|---|
| | | | | 427/272 |
| 2008/0311378 A1* | 12/2008 | Simpson | ................ | C08J 9/0066 |
| | | | | 428/319.1 |
| 2013/0009659 A1* | 1/2013 | Liu | ........................ | G01R 35/00 |
| | | | | 324/756.02 |
| 2013/0118773 A1* | 5/2013 | Liu | ........................... | C09J 7/00 |
| | | | | 174/117 F |

FOREIGN PATENT DOCUMENTS

| JP | 61-176106 A | 8/1986 |
|---|---|---|
| JP | 63-111038 A | 5/1988 |
| JP | H06-509293 A | 10/1994 |
| JP | 2001-294676 A | 10/2001 |
| JP | 2005-220157 A | 8/2005 |
| JP | 5620110 B2 | 11/2014 |
| WO | 2014001332 A1 | 1/2014 |
| WO | 2014001334 A1 | 1/2014 |
| WO | 201446164 A1 | 3/2014 |

OTHER PUBLICATIONS

Stabik J. et al, "Magnetic induction of polymer composites filled with ferrite powders", International Scientific Journal, Jan. 2010, Issue 1, vol. 41, pp. 13-20.
European Patent Office, Extended European Search Report in European Patent Application No. 15170683.5-1703, dated Jul. 7, 2016, 13 pages.
The State Intellectual Property Office of the People's Republic of China, Notification of the First Office Action and Search Report regarding Chinese Patent Application No. 201510527524.0, dated Dec. 6, 2017, 17 pages.
Japanese Patent Office, Office Action regarding Japanese Patent Application No. 2015-065981, dated May 14, 2018, 8 pages.

* cited by examiner

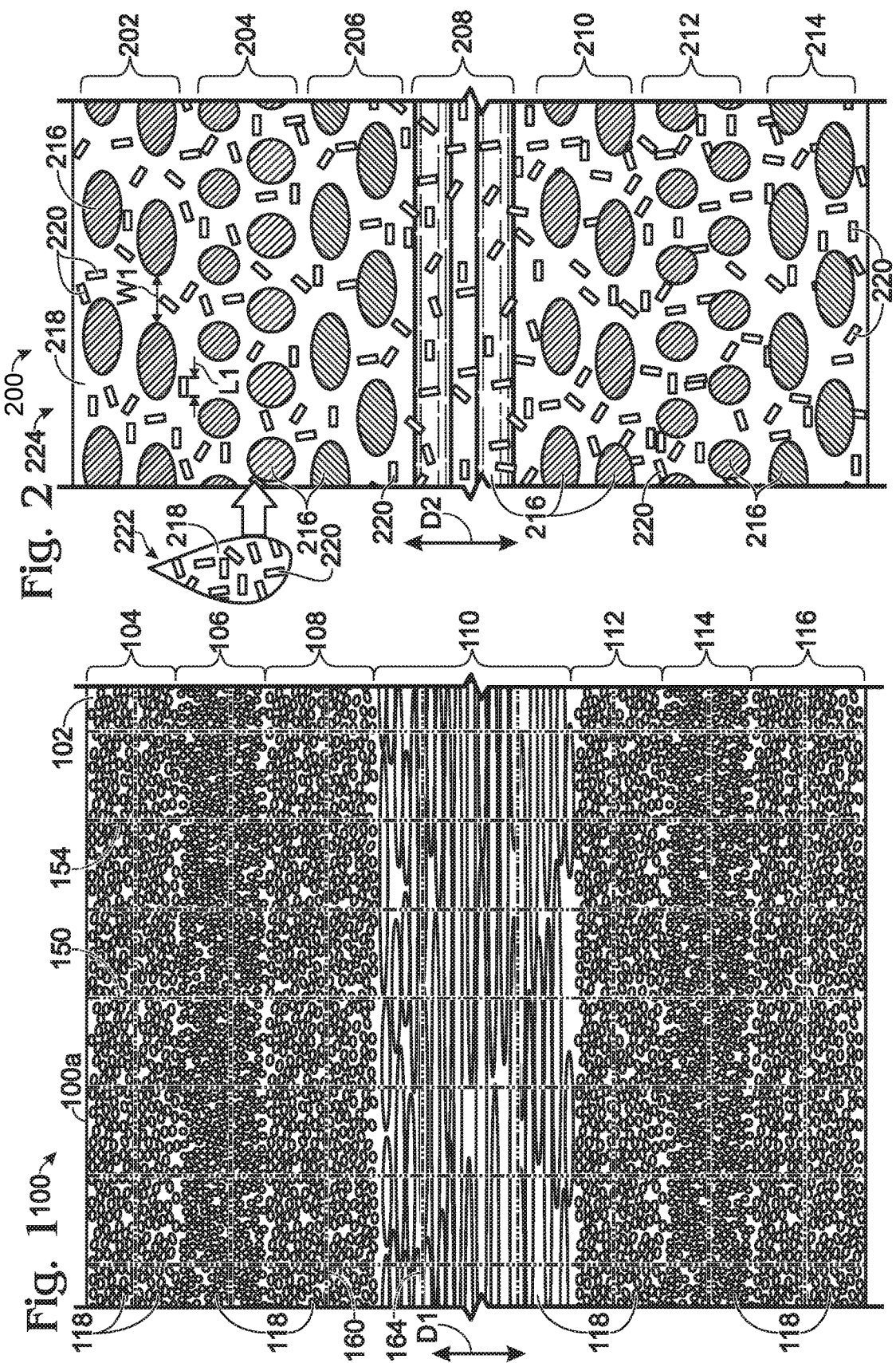

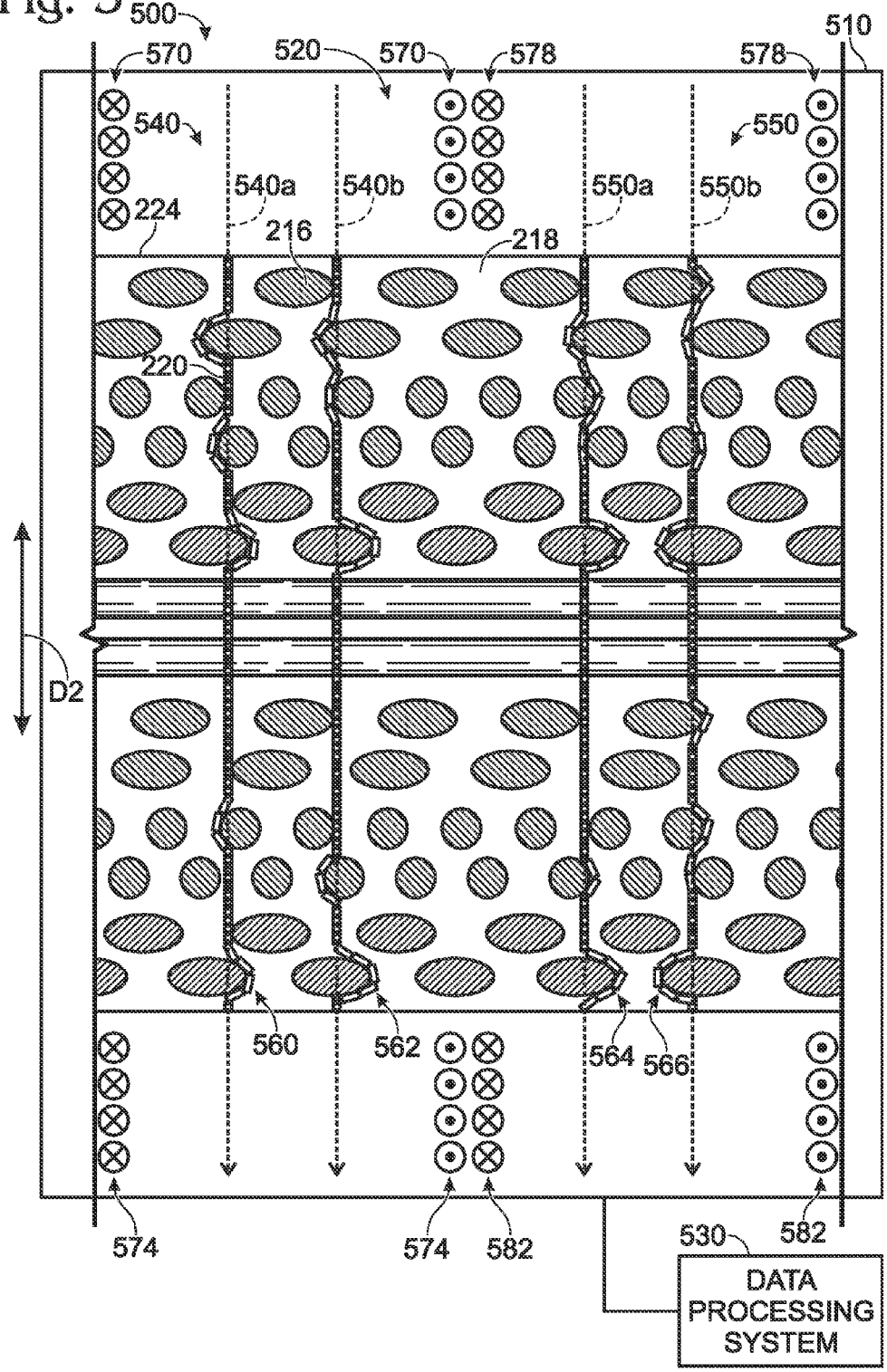

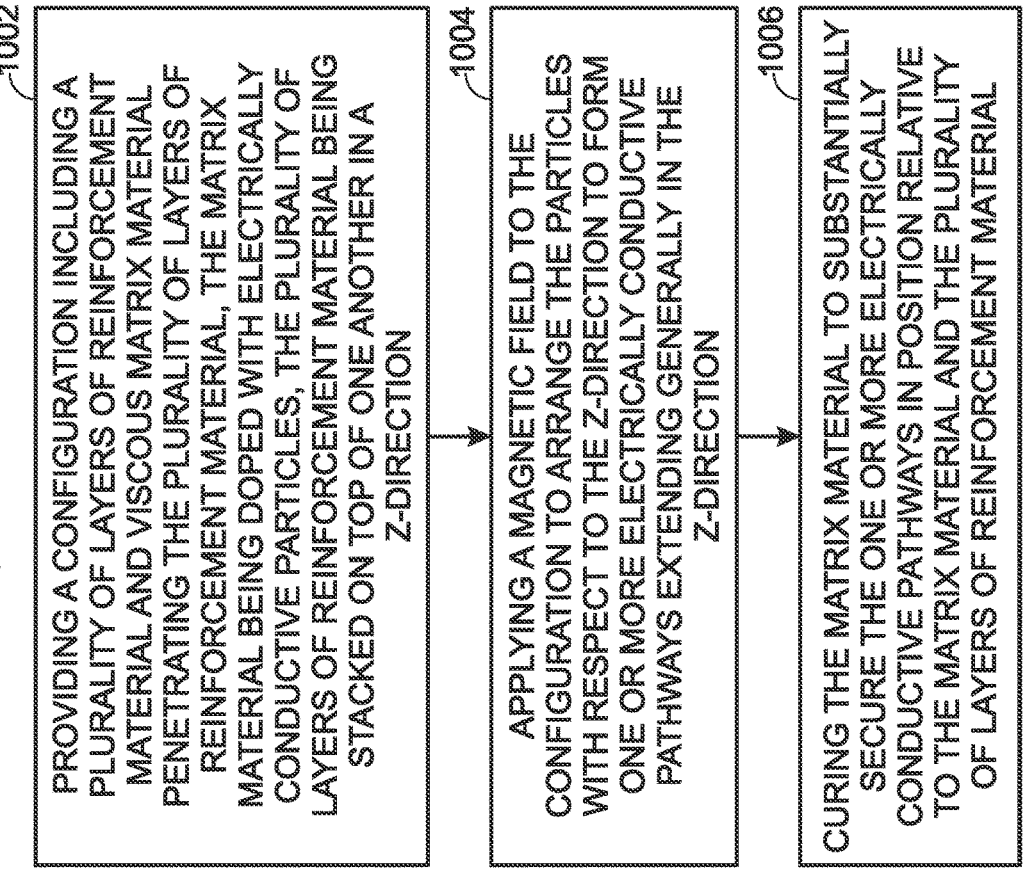

Fig. 10

1002 — PROVIDING A CONFIGURATION INCLUDING A PLURALITY OF LAYERS OF REINFORCEMENT MATERIAL AND VISCOUS MATRIX MATERIAL PENETRATING THE PLURALITY OF LAYERS OF REINFORCEMENT MATERIAL, THE MATRIX MATERIAL BEING DOPED WITH ELECTRICALLY CONDUCTIVE PARTICLES, THE PLURALITY OF LAYERS OF REINFORCEMENT MATERIAL BEING STACKED ON TOP OF ONE ANOTHER IN A Z-DIRECTION

1004 — APPLYING A MAGNETIC FIELD TO THE CONFIGURATION TO ARRANGE THE PARTICLES WITH RESPECT TO THE Z-DIRECTION TO FORM ONE OR MORE ELECTRICALLY CONDUCTIVE PATHWAYS EXTENDING GENERALLY IN THE Z-DIRECTION

1006 — CURING THE MATRIX MATERIAL TO SUBSTANTIALLY SECURE THE ONE OR MORE ELECTRICALLY CONDUCTIVE PATHWAYS IN POSITION RELATIVE TO THE MATRIX MATERIAL AND THE PLURALITY OF LAYERS OF REINFORCEMENT MATERIAL

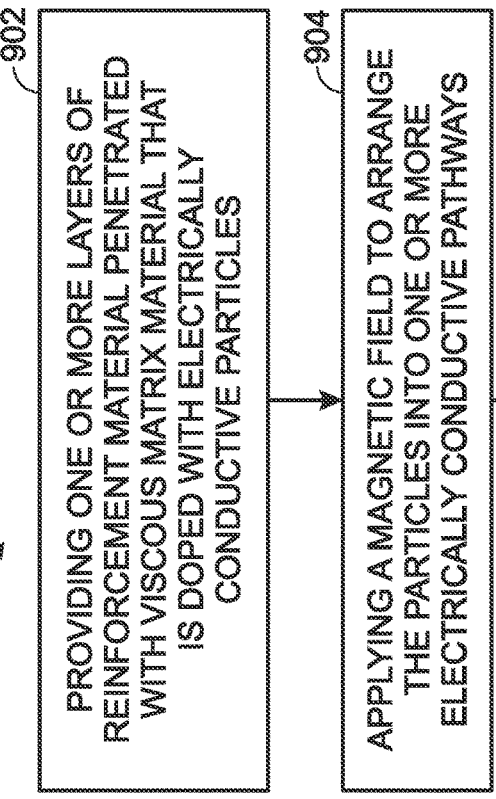

Fig. 9

902 — PROVIDING ONE OR MORE LAYERS OF REINFORCEMENT MATERIAL PENETRATED WITH VISCOUS MATRIX MATERIAL THAT IS DOPED WITH ELECTRICALLY CONDUCTIVE PARTICLES

904 — APPLYING A MAGNETIC FIELD TO ARRANGE THE PARTICLES INTO ONE OR MORE ELECTRICALLY CONDUCTIVE PATHWAYS

906 — CURING THE MATRIX MATERIAL TO A CURED STATE TO SUBSTANTIALLY SECURE THE ONE OR MORE ELECTRICALLY CONDUCTIVE PATHWAYS IN POSITION RELATIVE TO THE ONE OR MORE LAYERS OF REINFORCEMENT MATERIAL

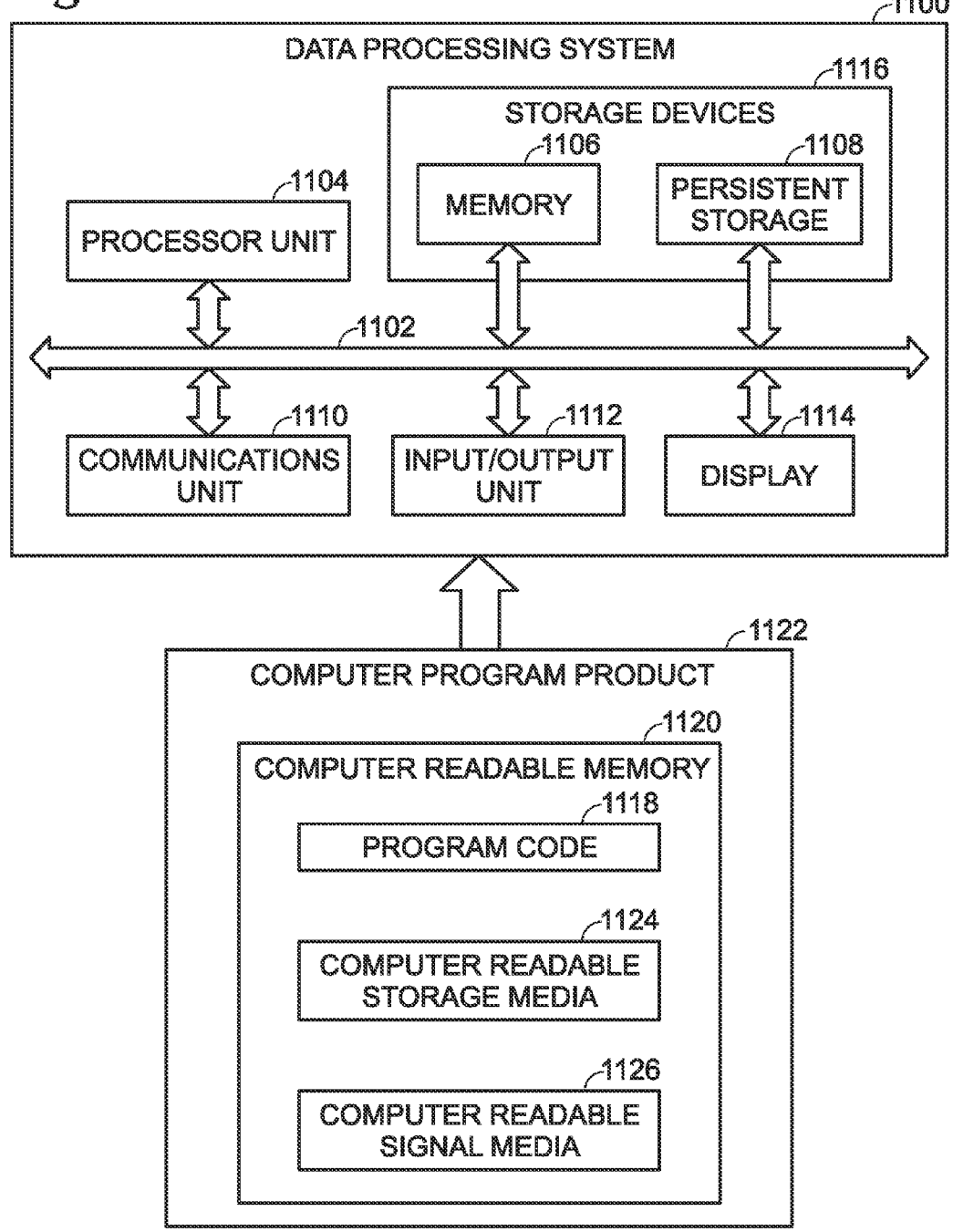

COMPOSITE MATERIALS WITH IMPROVED ELECTRICAL CONDUCTIVITY AND METHODS OF MANUFACTURE THEREOF

FIELD

This disclosure relates to composite materials. More specifically, the disclosed embodiments relate to methods of manufacturing composite materials with improved electrical conductivity.

INTRODUCTION

Composite materials are typically made from two or more constituent materials with significantly different physical or chemical properties. Typically, the constituent materials include a matrix (or bond) material, such as resin (e.g., thermoset epoxy), and a reinforcement material, such as a plurality of fibers (e.g., carbon fibers). When combined, the constituent materials typically produce a composite material with characteristics different from the individual constituent materials even though the constituent materials generally remain separate and distinct within the finished structure of the composite material.

Composite materials may be preferred for many reasons. For example, composite materials may be stronger and/or lighter than traditional materials. As a result, composite materials are generally used to construct various objects such as vehicles (e.g., airplanes, automobiles, boats, bicycles, and/or components thereof), and non-vehicle structures (e.g., buildings, bridges, swimming pool panels, shower stalls, bathtubs, storage tanks, and/or components thereof).

Various composite materials, such as carbon-fiber-reinforced polymer (CFRP), typically exhibit relatively low levels of electrical conductivity, particularly through their thickness. However, such low levels of electrical conductivity may be undesirable in some applications. Accordingly, a need exists for composite materials with improved electrical conductivity and methods of manufacture thereof.

SUMMARY

A composite material may comprise one or more layers of reinforcement material, matrix material, and a plurality of electrically conductive particles. The one or more layers of reinforcement material may each have a thickness in a z-direction. The matrix material may penetrate the one or more layers of reinforcement material. The particles may be disposed in the matrix material and non-randomly arranged to provide enhanced conductivity in the z-direction.

A method of manufacturing a composite material may comprise a step of providing one or more layers of reinforcement material penetrated with viscous matrix material. The matrix material may be doped with electrically conductive particles. The method may further comprise a step of applying a magnetic field to arrange the particles into one or more electrically conductive pathways. Moreover, the method may further comprise a step of curing the matrix material to a substantially cured state to secure the one or more electrically conductive particles in position relative to the one or more layers of reinforcement material.

Another method of manufacturing a composite material may comprise a step of providing a configuration including a plurality of layers of reinforcement material and viscous matrix material. The plurality of layers of reinforcement material may be stacked on top of one another in a z-direction. The matrix material may be doped with paramagnetic electrically conductive particles, and may penetrate the plurality of layers of reinforcement material. The method may further comprise a step of applying a magnetic field to the configuration to arrange the particles with respect to the z-direction to form one or more electrically conductive pathways extending generally in the z-direction. Moreover, the method may further comprise a step of curing the matrix material to substantially secure the one or more electrically conductive pathways in position relative to the matrix material and the plurality of layers of reinforcement material.

The present disclosure provides various composite materials, and methods of manufacture thereof. In some embodiments, a method may include arranging paramagnetic particles into electrically conductive chains with a magnetic field, and holding those chains in position until a matrix material in which the particles are disposed is cured to a substantially cured state to secure the chains in position relative to the matrix material and plural layers of reinforcement material. In some embodiments, the particles may have an aspect ratio greater than one, such that each of the particles has a greater length than width. In some embodiments, the reinforcement material may include a plurality of discrete fibers. A gap between adjacent discrete fibers of the reinforcement material may be wider than the length of the particles, which may allow for one or more of the particles to more easily rotate in the gap during an arrangement process caused by the applied magnetic field. In some embodiments, the chains may improve electrically conductivity by extending generally in a stacking direction of the plural layers of reinforcement material. In other embodiments, the chains may improve electrically conductively by extending generally perpendicular to the stacking direction, or in any other suitable direction. The features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is a cross-sectional view of a composite material including a plurality of layers of reinforcement material and a matrix material, with electrical conductive pathways for enhancing conductivity schematically shown in dash double dot lines.

FIG. 2 is a schematic diagram depicting a viscous matrix material doped with electrically conductive particles, with the viscous matrix material penetrating a plurality of layers of reinforcement material stacked in a z-direction similar to those shown in FIG. 1.

FIG. 5 is a schematic diagram similar to FIG. 3, but depicting an applied magnetic field generated by a plurality of solenoids positioned opposite from one another relative to the reinforcement material to arrange the particles into a similar configuration of electrically conductive pathways.

FIG. 9 is a flowchart depicting another method of manufacturing a composite material.

FIG. 10 is a flowchart depicting another method of manufacturing a composite material.

FIG. 11 is a schematic diagram of various components of an illustrative data processing system.

DESCRIPTION

Overview

Figure 3:
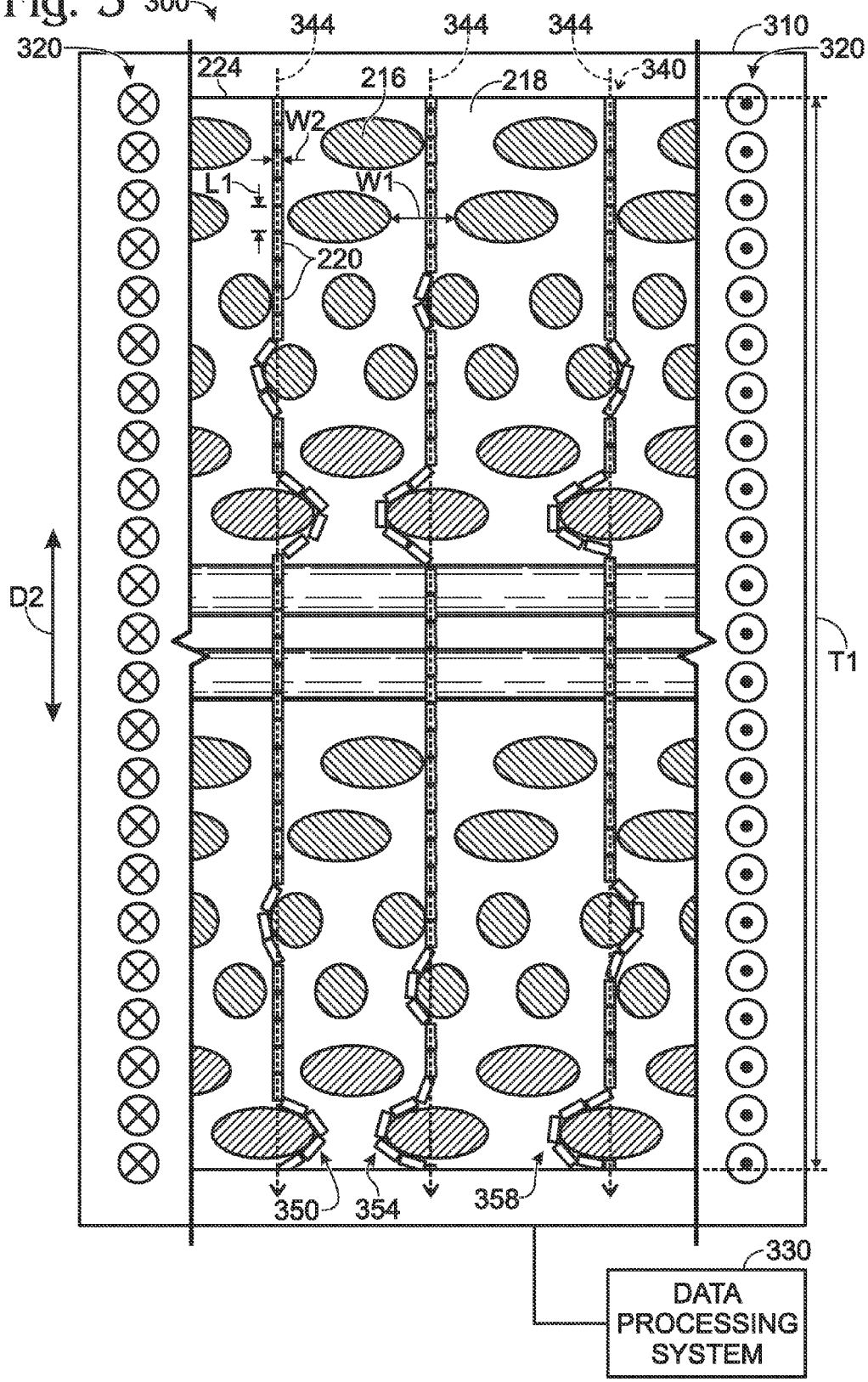
FIG. 3 is a schematic diagram depicting arrangement of the particles by an applied magnetic field to form a plurality of electrically conductive pathways extending generally in the z-direction.

Various embodiments of composite materials with improved electrical conductivity and methods of manufacture thereof are described below and illustrated in the associated drawings. Unless otherwise specified, a material (or method of manufacture thereof) and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar composite materials (or methods of manufacture thereof). The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

EXAMPLES, COMPONENTS, AND ALTERNATIVES

The following examples describe selected aspects of exemplary composite materials (and/or methods of manufacture thereof). These examples are intended for illustration and should not be interpreted as limiting the entire scope of the present disclosure. Each example may include one or more distinct inventions, and/or contextual or related information, function, and/or structure.

Example 1

This example describes an illustrative composite material 100 including a plurality of layers (or plural layers) of reinforcement material and a matrix material; see FIG. 1.

In this example, composite material 100 includes matrix material 102, and first, second, third, fourth, fifth, sixth, and seventh layers 104, 106, 108, 110, 112, 114, 116 of reinforcement material 118. As shown, layers 104, 106, 108, 110, 112, 114, 116 are stacked on top of one another in a z-direction (or stacked direction, or stacking direction) D1. Further, each of layers 104, 106, 108, 110, 112, 114, 116 may have a thickness in z-direction D1 which is penetrated by matrix material 102. As can be inferred from FIG. 1, z-direction D1 may be a direction normal to a plane defined by one of the layers of reinforcement material, normal to a plane defined by composite material 100, and/or normal to a plane defined by a local portion of any one of the foregoing.

Matrix material 102 may be any suitable material for penetrating and/or bonding together layers 104, 106, 108, 110, 112, 114, 116. For example, matrix material 102 may be a thermosetting polymer, such as an aerospace-grade epoxy resin.

Reinforcement material 118 may be a fibrous material, such as a material including discrete carbon fibers, which may be provided in a tape configuration, as shown. In particular, fibers 118 may each have a diameter of about 5 to 7 microns (μm), and gaps between adjacent fibers 118 may each have a width of about 1 μm. In other embodiments, the fibrous material may be provided in another suitable configuration, such as a woven fabric.

In FIG. 1, each of the layers is shown including similar reinforcement material, but rotated approximately 45 degrees with respect to the adjacent layer(s) about an axis vertically parallel to the plane of the view. In particular, material 118 of layer 104 may generally form a 45 degree angle with the plane of the view, with each fiber of layer 104 projecting into the view and rightward, and projecting out of the view and leftward. Material 118 of layer 106 may be generally rotated 45 degrees with respect to material 118 of layer 104 about the axis, such that material 118 of layer 106 is generally normal to the view, and so on. More specifically, material 118 of layer 106 may be angularly displaced by about 45 degrees with respect to material 118 of layer 104. Material 118 of layer 108 may be angularly displaced by about 90 degrees with respect to material 118 of layer 104. Material 118 of layer 110 may be angularly displaced by about 135 degrees with respect to material 118 of layer 104. Material 118 of layer 112 may be angularly displaced by about 180 degrees with respect to material 118 of layer 104. Material 118 of layer 114 may be angularly displaced by about 225 degrees with respect to material 118 of layer 104, and material 118 of layer 116 may be angularly displaced by about 270 degrees with respect to material 118 of layer 104.

However, in other embodiments, the layers of reinforcement material may have other orientations with respect to one another, and/of different layers may include different types of reinforcement material. For example, top and/or bottom layers may be woven fabric layers made of glass fibers, or an intermediate layer may include a reinforcement material made of a honeycomb-like structured material. Further, other embodiments may include more or less layers, such as 120 layers, or just one layer. Moreover, other embodiments may include layers with thicknesses that are thinner or thicker than shown. For example, some embodiments may include layers with thicknesses about three times what is shown in FIG. 1.

While reinforcement material 118 may be moderately electrically conductive, matrix material 102 may be a dielectric material, such as a polymer resin. Thus, composite material 100 may be moderately electrically conductive in an x-direction (e.g., a horizontal direction with respect to the view) through material 118 of layers 104, 108, 110, 112, 1116, and in a y-direction (e.g., a direction normal to the view) through material 118 of layers 104, 106, 108, 112, 114, 116. However, gaps between adjacent portions (e.g. fibers) of material 118 may be filled with dielectric matrix material 102 thereby hindering electrical conductivity between those adjacent portions, resulting in relatively low electrical conductivity in z-direction D1.

In such a configuration, electrical current incident on composite material 100 may not be easily dissipated resulting in possible damage to associated layers of composite material 100. For example, electrical current incident on a first surface 100a of composite material 100 may be concentrated in matrix material 102 near surface 100a and/or layer 104. Moreover, electrical current incident on a second surface 100b of composite material 100 may be concentrated in matrix material 102 near surface 100b and/or layer 116.

However, the applicant has discovered that electrical conductivity in a desired direction may be improved by, for example, doping the matrix material with electrically conductive particles (e.g., made of a paramagnetic material), applying a magnetic field to the matrix material when the matrix material has relatively low viscosity to arrange the particles into one or more electrically conductive pathways, and curing the matrix material to at least a substantially cured state to secure the pathways in position, as will be described below in more detail. In particular, forming such electrical pathways through a thickness of the composite material in the z-direction, such as pathways 150, 154 schematically depicted with vertical dash double dot lines (see also FIGS. 3 and 5), may reduce electrical current concentration. Further, forming electrical pathways that extend in the x and/or y directions (e.g., in the plane of a layer), such as pathways 160,164 schematically depicted with horizontal dash double dot lines (see also FIG. 6), may increase an amount of electrical current that can flow through a particular layer without damaging the material of that layer.

Example 2

This example describes an illustrative composite material 200 including layers 202, 204, 206, 208, 210, 212, 214 of reinforcement material (e.g., fibers 216) stacked in z-direction D2, and matrix material 218 doped with electrically conductive particles 220; see FIGS. 2-6.

While layers 202, 204, 206, 208, 210, 212, 214 are schematically depicted in FIG. 2 to simplify the illustration, these layers may be similar in structure to the layers of composite material 100. For example, each of fibers 216 may have a diameter of about 5 µm to 7 µm, and each gap between adjacent fibers 216 may have a respective width W1, which may be about 1 µm in dimension.

In this example, matrix material 218 may be heated until viscous. Particles 220 may be mixed into viscous matrix material 218 (e.g., when matrix material 218 is in a substantially liquid state) to produce a doped mixture 222. Particles 220 may be made of a material that generally aligns along magnetic field lines, such as a paramagnetic material, such as aluminum or lithium, or a ferromagnetic material, such as iron. It should be noted that while a particular concentration of particles 220 in matrix material 218 is shown, such a concentration may be adapted to produce the desired enhanced conductivity when the particles are arranged (or oriented), as will be described below in further detail. For example, the particle concentration may be any where in a range of about 0.01 weight % to 0.99 weight %, but in some embodiments may be higher or lower depending on materials used and their particular application.

In some embodiments, one or more of layers 202, 204, 206, 208, 210, 212, 214 may be pre-impregnated or pre-penetrated with mixture 222 to produce one or more layers of pre-impregnated reinforcement material (e.g., doped "pre-preg"). The doped pre-preg may then be stacked, and subsequently heated to produce a configuration 224 in which matrix material 218 is viscous (e.g., has a relatively low viscosity level to allow the particles to move therein).

In other embodiments, configuration 224 may be provided in other ways. For example, in a resin transfer molding embodiment, one or more of layers 202, 204, 206, 208, 210, 212, 214 may be stacked on top of one another, and mixture 222 may then be applied to the stack and allowed to penetrate layers 202, 204, 206, 208, 210, 212, 214 to produce configuration 224.

FIG. 3 depicts an apparatus 300, which may include any suitable device, system, structure, or mechanism for arranging, orienting, and/or securing particles 220 relative to reinforcement material 216 and/or matrix material 218. For example, apparatus 300 may include a curing device 310, a magnetic-field-generating device 320, and a data processing system 330. Curing device 310 may be configured to alter a temperature of configuration 224, which may alter a viscosity of matrix material 218. Magnetic-field-generating device 320 may be configured to generate a magnetic field 340 having field lines 344 for arranging particles 220 when matrix material 218 has a suitably low viscosity (e.g., in one or more temperature ranges). System 330 may be configured to control and/or monitor one or more respective functions of curing device 310 and/or magnetic-field-generating device 320, which may enable apparatus 300 to at least partially coordinate application of magnetic field 340 with application of energy to configuration 224 from curing device 310.

More specifically, curing device 310 may be configured to apply energy, such as thermal energy and/or microwave radiation, to configuration 224. For example, curing device 310 may be an autoclave in which configuration 224 may be disposed. In other examples, curing device 310 may include a microwave-emitting housing, as described in U.S. patent application Ser. No. 14/276,918, which is hereby incorporated by reference in its entirety for all purposes. For example, the microwave-emitting housing may be configured to at least partially enclosed configuration 224 in a cure zone. In yet other examples, curing device 310 may not externally apply energy to configuration 244, but rather may be a composition added to configuration 224 for producing a suitable cure. In some embodiments, a vacuum bag may be operatively coupled to configuration 224 to compress together components of configuration 224 while energy from curing device 310 is applied to configuration 224.

Figure 4:
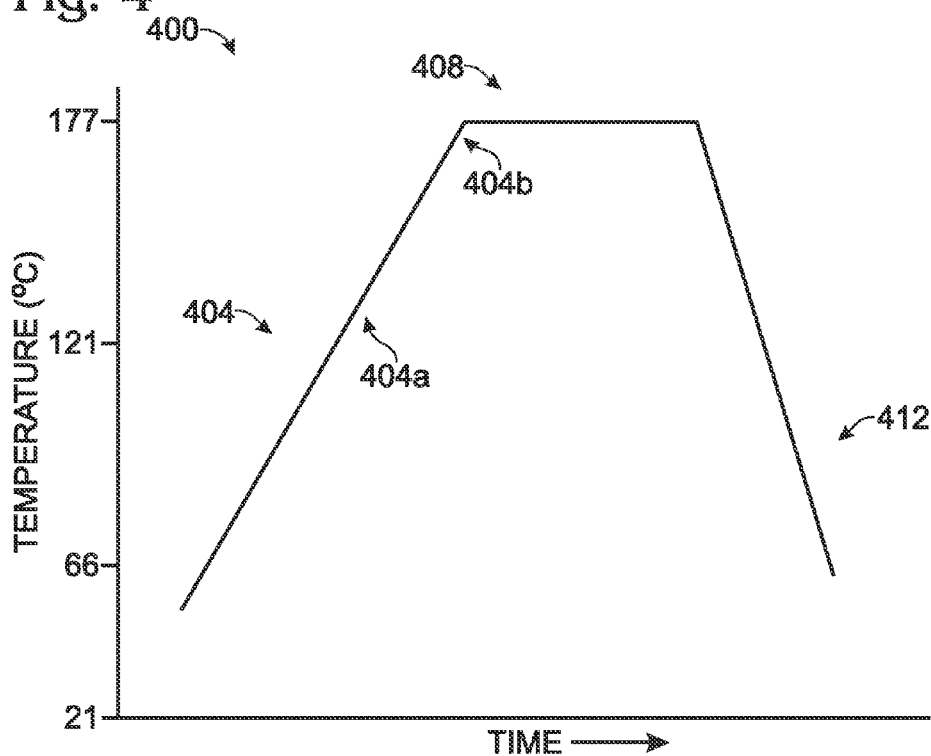
FIG. 4 is a chart of an illustrative cure cycle, which may be implemented to cure the matrix material thereby substantially securing the electrically conductive pathways in position relative to the matrix and reinforcement materials.

The application of energy by device 310 to configuration 224 may be configured to increase, hold, and/or decrease the temperature of configuration 224 according to a suitable cure cycle, such as a cure cycle 400 depicted in FIG. 4. In particular, cycle 400 may include a heat ramp-up phase 404, a hold phase 408, and a cool-down phase 412.

Application of energy to configuration 224 by curing device 310 may result in configuration 224 having a suitably low viscosity for movement of particles 220 therein. For example, phase 404 may begin at a first predetermined temperature of configuration 224, such as at 54 degrees Celsius. In some embodiments, energy applied from curing device 310 to configuration 224 may be used to heat configuration 224 to the first predetermined temperature. In some embodiments, configuration 224 may be initially heated by another source, such as a heat gun, which may be used to heat tack one or more layers in position. Phase 404 may involve increasing the temperature of configuration 224 at a first predetermined rate, such as at a rate in a range of about 0.5 to 3 degrees Celsius per minute. Phase 404 may continue until configuration 224 reaches a second predetermined temperature, which may be a cure (or cured) temperature of matrix material 218, such as a temperature of 177 degrees Celsius plus or minus 6 degrees Celsius. As the temperature of configuration 224 increases from the first predetermined temperature to the second predetermined temperature, the viscosity of matrix material 218 may first decrease in a portion 404a of phase 404, and then increase in a portion 404b of phase 404 near the second predetermined temperature. During portion 404a, the viscosity level of matrix material 218 may be sufficiently low to allow movement of particles 220 therein. During portion 404b, the viscosity level of matrix material 218 may be sufficiently high to prevent movement of particles 220 therein. For example, a temperature range associated with portion 404b may correspond to matrix material 218 being cured to a substantially cured state.

Accordingly, during portion 404a, magnetic-field-generating device 320 may be configured to generate magnetic field 340 for arranging particles 220 when the viscosity of matrix material 218 is suitably low. For example, device 320 may include a solenoid, as shown. The solenoid may be disposed inside curing device 310. However, in other examples one or more portions of magnetic-field-generating device 320, such as windings of the solenoid, may be disposed outside of device 310 or may form (or be disposed in) one or more wall portions of curing device 310. As shown, the solenoid may be configured to generate field 340 having field lines 344, for example, by electrical current flowing in a right-hand-rule down direction through conductive windings of the solenoid surrounding configuration 224. In particular, the current may flow out of the view through conductive winding portions on the right-hand side of the FIG. 3, and into the view through associated conductive winding portions on the left-hand side of FIG. 3. As a result, field lines 344 may extend generally parallel to z-direction D2. Also, field lines 344 may extend through an overall thickness of configuration 224 in z-direction D2.

Application of field 340 to configuration 224, particularly during the one or more durations of low viscosity of matrix material 218, may cause particles 220 to non-randomly arrange to provide enhanced conductivity, such as in z-direction D2, as shown. For example, in contrast to randomly arranged particles 220 shown in FIG. 2 (e.g., with the particles having a relatively normal distribution and no apparent net directionality), application of the magnetic field may order a substantial percentage of particles 220 into a non-randomly arranged configuration, which may have a general directionality. In particular, application of field 340 may induce a magnetic dipole moment in each of particles 220 thereby causing a substantial portion of particles 220 to generally arrange (or chain together) along one or more of field lines 344 to form electrically conductive pathways 350, 354, 358. In some embodiments, the substantial percentage may be more than 50%, and in some cases may approach 100%, as shown.

As mentioned above, the electrically conductive pathways may enhance electrically conductivity. For example, each of pathways 350, 354, 358 may include two or more of particles 220 in electrical contact (e.g., physical contact) with one another. In particular, arrangement of particles 220 via application of field 340 may electrically interconnect a first subset of particles 220 into pathway 350, electrically interconnect a second subset of particles 220 into pathway 354, and electrically interconnect a third subset of particles 220 into pathway 358. Pathways 350, 354, 358 may be disposed in matrix material 218, and displaced from one another in a direction orthogonal to z-direction D2.

As shown, pathways 350, 354, 358 may extend generally in z-direction D2 along respective field lines of field 340. Each of pathways 350, 354, 358 may extend between two or more of discrete spaced apart fibers 216 (e.g., in each of the layers), and in some locations at least partially wrap around (and/or contact) at least portion of one or more of fibers 216. Moreover, each of pathways 350, 354, 358 may extend through a majority of an overall thickness T1 of the layers of configuration 224. For example, each of pathways 350, 354, 358 may extend through the entire thickness T1. However, in some embodiments, the pathways may extend through less than the entire overall thickness, and in some cases, may extend through less than a majority or the entire thickness, but still enhance electrical conductivity of the resulting composite material.

Particles 220 may have any suitable dimensions for orientation in configuration 224 via application of field 340. For example, a majority of particles 220 may each have a length L1 that is less than width W1 of the gaps separating adjacent fibers, which may allow the respective particles to rotate more freely between adjacent fibers and/or prevent the respective particles from becoming lodged between adjacent fibers. Further, each of (or a majority of) particles 220 may have a respective aspect ratio greater than one (1), which may enhance a magnetic moment induced in each of the respective particles and allow for the particles to be more easily arranged by the applied magnetic field. In particular, the aspect ratio of a respective particle may be defined as length L1 of the respective particle divided by another dimension (e.g., width W2) of the respective particle that is orthogonal to the L1. In some embodiments, the aspect ratio may be greater than two (2), as shown, or may be even greater. However, in some embodiments, the particles may be substantially spherical or cubical having respective aspect ratios of about 1/1.

Preferably, magnetic-field-generating device 320 may generate and apply field 340 at least until matrix material 218 has reached the substantially cured state (or predetermined cure state), which may prevent one or more of particles 220 from moving out of alignment with an adjacent particle. For example, once matrix material 218 has reached the substantially cured state, the pathways may be secured in position relative to reinforcement and matrix materials 216, 218, at which time magnetic-field-generating device may be configured to stop generating (or release, or remove) field 340.

Curing device 310 may then apply energy to configuration 224 to finish portion 404b, and perform phases 408, 412, and thereby finish curing configuration 224 to produce a resulting composite material including cured matrix material 218, reinforcement material 216, and secured pathways 350, 354, 358. For example, phase 408 may begin when configuration 224 reaches the second predetermined temperature. Phase 408 may involve holding or maintaining the second predetermined temperature (e.g., plus or minus 6 degrees Celsius) for a predetermined duration of time, such as 150 to 210 minutes. Maintaining the second predetermined temperature for the predetermined duration of time may suitably bond matrix material 218 to both reinforcement material 216 and particles 220. Phase 412 may start when the predetermined duration of time has lapsed. Phase 412 may involve decreasing the temperature of configuration 224 at a second predetermined rate, such as at a rate that is less than or equal to 3 degrees Celsius per minute. The second predetermined rate may be a maximum rate at which the temperature of configuration 224 can be reduced without reducing a strength of the resulting composite material. Phase 412 may continue until configuration 224 reaches a third predetermined temperature, such as a temperature at or below 60 degrees Celsius. Once configuration 224 has reached the third predetermined temperature, pressure inside the vacuum bag may be released, the vacuum bag may be removed from cured configuration 224, and cured configured 224 (e.g., the resulting composite material) may be removed from apparatus 300 and inspected.

However, in some embodiments, device 320 may be configured to apply field 340 to configuration through portion 404b, one or more portions of phase 408, and/or one or more portions of phase 412, which may be preferable if one or more of those portions happen to reduce the viscosity level of matrix material 218 such that particles 220 are able to move relative to matrix material 218.

As mentioned above, data processing system 330 may be configured to control and/or monitor one or more respective functions of curing device 310 and/or magnetic-field-generating device 320. For example, system 330 may be configured to control a level of energy applied to configuration 224 by curing device 310, to control a strength and/or a direction of magnetic field 340 generated by magnetic-field-generating device 320, to determine (or estimate) a viscosity level of matrix material 218, and/or to control one or more of devices 310, 320 based on the determined (or estimated) viscosity level.

In particular, a sequence of one or more temperature ramps and/or holds may be input (e.g., by a user) into system 330, such as a sequence corresponding to phases 404, 408, 412. System 330 may then correspondingly control curing device 310 to apply energy to configuration 224 to perform phases 404, 408, 412. Further, system 330 may include, store, and/or run one or more software applications (e.g., RAVEN Simulation Software by Convergent Manufacturing Technologies of Vancouver, B.C.) configured to determine (and/or estimate) when the viscosity level of matrix material 218 is sufficiently low to allow movement of particles 220 therein, which may allow the user and/or system 330 to determine when to begin applying field 340 and/or when to stop applying field 340. For example, the software application may be configured to receive the input sequence (e.g., by the user inputting the sequence into the software application, or system 330 inputting the sequence to the software application). The software application may also be configured to receive data corresponding to material compositions of configuration 224. The software application may then determine (or estimate) a degree of cure and/or a viscosity level of matrix material 218 at one or more (e.g., every) point along cure cycle 400 based on the input sequence and/or the received composition data, which may inform the user and/or system 330 when to apply field 340 during cycle 400 and/or when to stop applying field 340 during cycle 400.

System 330 may be configured to determine a magnetic field strength appropriate to arrange particles 220, based at least in part on the input sequence and/or the received composition data. For example, the received composition data may indicate that particles 220 include aluminum and/or lithium particles having respective magnetic susceptibilities of approximately $2.2 \times 10^{-5}$ and $1.4 \times 10^{-5}$. Further, based at least in part on the input sequence in conjunction with the received composition data, system 330 may determine that in order to form the pathways, the particles may have to move no more than 100 microns during a 20-minute window in which matrix material may have a viscosity of around 10 poise (or 1 Ns/m²). Accordingly, based on one or more of these determinations and inputs, system 330 may determine that a field strength of around 1.0 T may be appropriate to arrange particles 220 into pathways, and may correspondingly control magnetic-field-generating device 320. However, in some embodiments, other field strengths may be appropriate. For example, field 340 may have a strength of around 0.7 T, and in some cases even lower, which may be suitable for arranging particles 220.

In some embodiments, as the temperature of particles 220 increases (e.g., during phase 404), the induced magnetic moments of respective particles 220 may slightly decrease. Accordingly, system 330 may be configured to increase the strength of field 340 to compensate for such a decrease in the induced magnetic moments.

FIG. 5 depicts an apparatus 500, which may similarly include any suitable device, system, structure, or mechanism for arranging, orienting, and/or securing particles 220 relative to reinforcement material 216 and/or matrix material 218. For example, apparatus 500 may include a curing device 510, a magnetic-field-generating device 520, and a data processing system 530, one or more of which may be similar in structure and/or function to respective curing device 310, magnetic-field-generating device 520, and data processing system 530.

More specifically, curing device 510 may be configured to alter a viscosity of matrix material 218, and magnetic-field-generating device 520 may be configured to generate and apply magnetic fields 540, 550. Fields 540, 550 may have respective field lines 540a, 540b and 550a, 550b along which particles 220 may form respective electrically conductive pathways 560, 562, 564, 566 extending generally in z-direction D2. In particular, device 520 may include a first pair of generally aligned solenoids 570, 574, and a second pair of generally aligned solenoids 578, 582. Solenoids 570, 574 may be disposed opposite one another relative to configuration 224, and may each generate a respective magnetic field, which when combined together may form field 540. Similarly, solenoids 578, 582 may be disposed opposite one another relative to configuration 224, and may each generate a respective magnetic field, which when combined together may form field 550. Generating one or more magnetic fields by solenoids disposed opposite one another relative to configuration 224 may enable apparatus 500 to arrange pathways in relatively large composite material configurations, with first and second arrays of solenoids disposed opposite one another relative to the particular configuration. For example, while only a portion of configuration 224 is schematically shown here, configuration 224 may have a length of approximately 20 meters and a width of approximately 10 meters, or may have other relatively large dimensions. For example, configuration 224 may be used for producing a laminate composite wing skin panel for a commercial airliner.

Similar to apparatus 300, apparatus 500 may be configured to concurrently arrange particles 220 into electrically conductive pathways and cure matrix material 218. Further, apparatus 500 may be configured to stop applying magnetic fields 540, 550 once matrix material 218 has been cured to a predetermined cure state thereby securing the pathways in position, for example, in a manner similar to that described above with reference to FIGS. 3 and 4.

Figure 6:
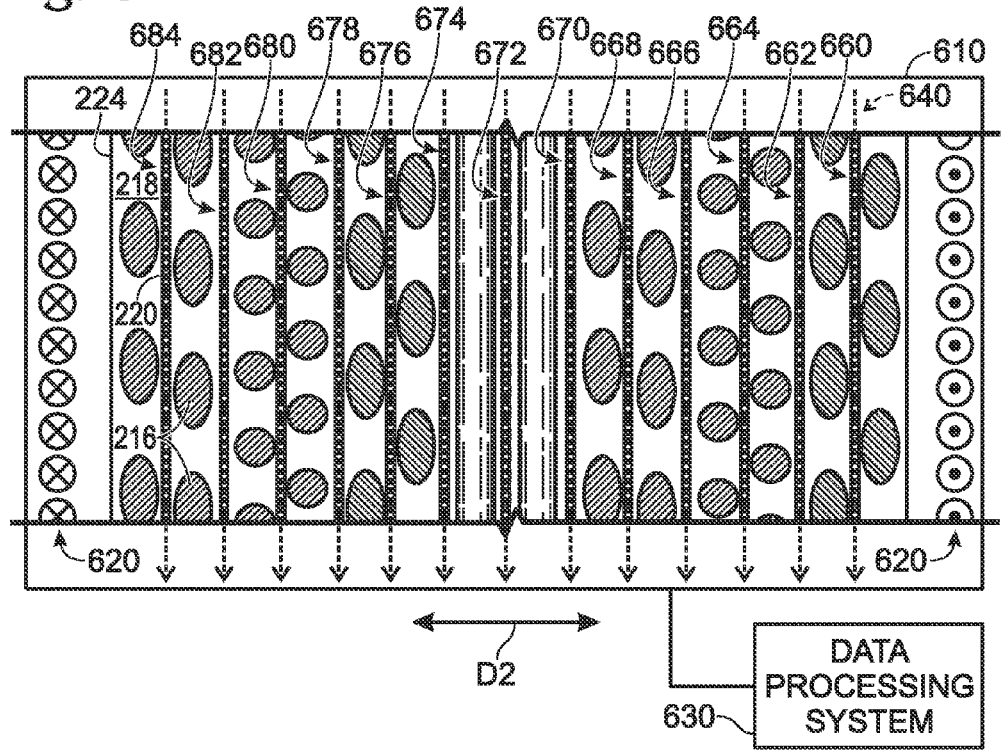
FIG. 6 is a schematic diagram similar to FIG. 3, but depicting an applied magnetic field configured to arrange the particles in a direction generally perpendicular to the z-direction.

FIG. 6 depicts an apparatus 600, which may also similarly include any suitable device, system, structure, or mechanism for arranging, orienting, and/or securing particles 220 relative to reinforcement material 216 and/or matrix material 218. For example, apparatus 600 may include a curing device 610, a magnetic-field-generating device 620, and a data processing system 630, one or more of which may be similar in structure and/or function to curing devices 310, 510, magnetic-field-generating devices 320, 520, or data processing systems 330, 530. However, device 620 may be configured to generate a magnetic field 640 having field lines that are generally orthogonal to z-direction D2. Application of field 640 to configuration 224 may arrange particles 220 into electrically conductive pathways 660, 662, 664, 666, 668, 670, 672, 674, 676, 678, 680, 682, 684. As shown, these pathways may extend in a direction generally orthogonal to z-direction D2, which may enhance conductivity of the resulting composite material in the x and/or y directions.

Example 3

Figure 7:
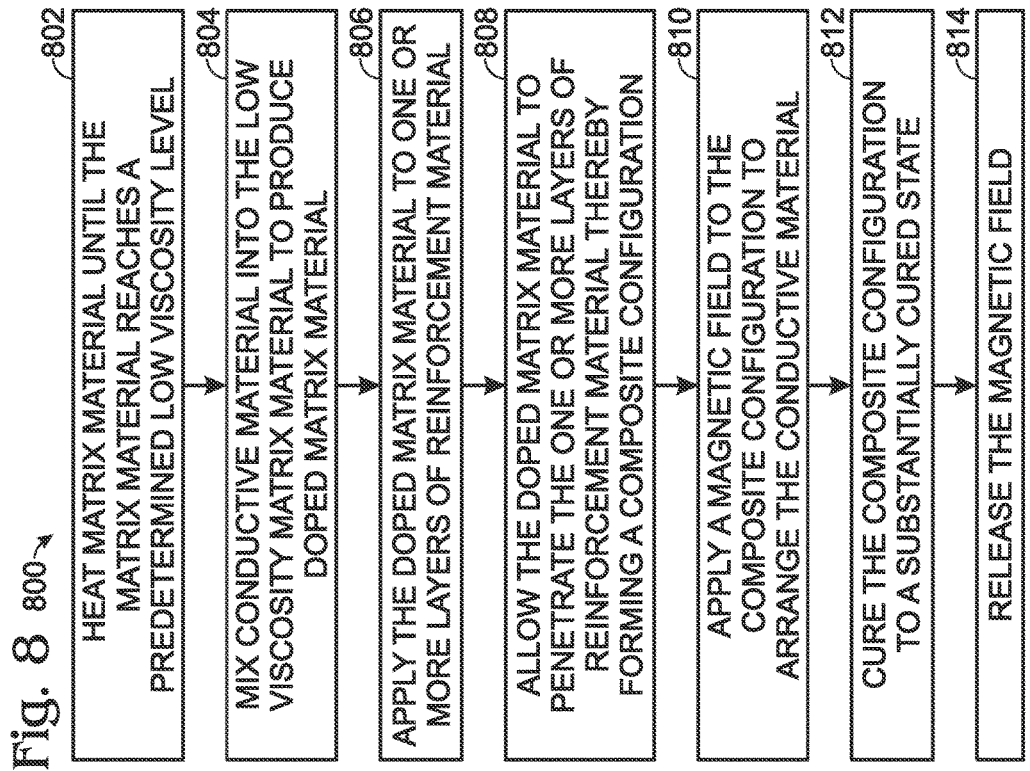
FIG. 7 is a flowchart depicting a method of manufacturing a composite material.

This example describes a method for manufacturing a composite material using pre-preg; see FIG. 7.

FIG. 7 is a flowchart illustrating steps performed in an illustrative method, and may not recite the complete process or all steps of the program. FIG. 7 depicts multiple steps of a method, generally indicated at 700. Although various steps of method 700 are described below and depicted in FIG. 7, the steps need not necessarily all be performed, and in some cases may be performed in a different order than the order shown.

Method 700 may include a step 702 of heating a matrix material until the matrix material has a relatively low viscosity, and a step 704 of mixing conductive material into the low viscosity matrix material to produce a doped matrix material. In some embodiments, the conductive material may include paramagnetic particles with aspect ratios greater than one (1).

Method 700 may further include a step 706 of applying the doped matrix material to reinforcement material (such as a layer of stacked carbon fibers) to produce a pre-preg. In some embodiments, producing the pre-preg may involve allowing the doped matrix material to penetrate the layer of stacked carbon fibers, and/or allowing the viscosity of the matrix material to increase such that the matrix material is substantially solid.

Method 700 may further include a step 708 of stacking the produced pre-preg (e.g., on another layer of pre-preg, which may or may not be doped with paramagnetic particles), and a step 710 of heating the stacked pre-preg until the doped matrix material has a relatively low viscosity. In some embodiments, the low viscosity of step 710 may correspond to a lower viscosity level than that of the relatively low viscosity of step 702. For example, at step 704, mixing the conductive particles into the matrix material may involve a mechanical stirring operation, which may be carried out when the matrix material is "thicker" (e.g., has a higher viscosity), while arranging the conductive particles, such as that described below, may be carried out when the matrix material is "thinner" (e.g., has a lower viscosity). In particular, the higher viscosity of matrix material at step 704 may be configured to prevent or inhibit the conductive particles from "settling" in the matrix material. For example, the higher viscosity of the matrix material at step 704 may be configured preserve suspension of the conductive particles in the matrix material when mixed (e.g., as is shown in FIG. 2). Further, the lower viscosity of the doped matrix material at step 710 may be configured to allow the conductive particles to move therein in response to an applied magnetic field. For example, the lower viscosity of the matrix material at step 710 may be configured to permit movement of the conductive particles into conductive chain sets in a z-direction (e.g., as is shown in FIG. 3) during application of the magnetic field.

For example, method 700 may further include a step 712 of applying a magnetic field to the stacked pre-preg to arrange (or chain together) the conductive material (e.g., the paramagnetic particles). For example, application of the magnetic field may arrange the conductive material into one or more electrically conductive pathways. In some embodiments, the pathways may generally extend in a z-direction. In other embodiments, the pathways may extend in a direction generally orthogonal to the z-direction.

Method 700 may further include a step 714 of curing the stacked pre-preg to a substantially cured state to produce a composite material, and a step 716 of releasing the magnetic field. For example, the substantially cured state of the doped matrix material may secure the pathways in position, and steps 712, 714 may at least partially overlap to prevent the conductive material from un-chaining prior to the substantially cured state.

Example 4

Figure 8:
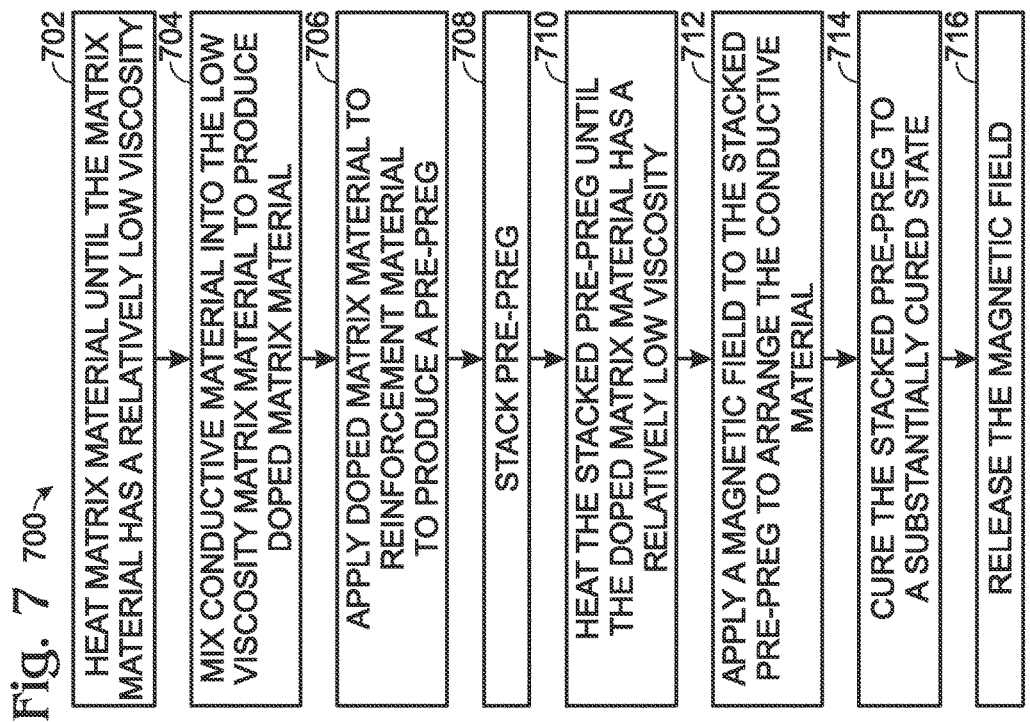
FIG. 8 is a flowchart depicting another method of manufacturing a composite material.

This example describes a method for manufacturing a composite material using resin transfer molding; see FIG. 8.

FIG. 8 is a flowchart illustrating steps performed in an illustrative method, and may not recite the complete process or all steps of the program. FIG. 8 depicts multiple steps of a method, generally indicated at 800. Although various steps of method 800 are described below and depicted in FIG. 8, the steps need not necessarily all be performed, and in some cases may be performed in a different order than the order shown.

Similar to method 700, method 800 may include a step 802 of heating a matrix material until the matrix material reaches a predetermined relatively low viscosity level, and a step 804 of mixing (or disposing) conductive material into the low viscosity matrix material to produce doped matrix material.

Method 800 may further include a step 806 of applying the doped matrix material to one or more layers of reinforcement material, and a step 808 of allowing the doped matrix material to penetrate the one or more layers of reinforcement material thereby forming a composite configuration.

Method 800 may further include a step 810 of applying a magnetic field to the composite configuration to arrange the conductive material (e.g., into one or more electrically conductive pathways), and a step 812 of curing the composite configuration to a substantially cured state thereby forming a composite material.

Method 800 may further include a step 814 of releasing the magnetic field. In some embodiments, the magnetic field may be released (or removed) prior to step 812. In other embodiments, the magnetic field may be released during step 812. In yet other embodiments, the magnetic field may be released after step 812.

Example 5

This example describes a method for manufacturing a composite material; see FIG. 9.

FIG. 9 is a flowchart illustrating steps performed in an illustrative method, and may not recite the complete process or all steps of the program. FIG. 9 depicts multiple steps of a method, generally indicated at 900. Although various steps of method 900 are described below and depicted in FIG. 9, the steps need not necessarily all be performed, and in some cases may be performed in a different order than the order shown.

At step 902, one or more layers of reinforcement material may be provided. The one or more layers of reinforcement material may be penetrated with viscous matrix material.

The viscous matrix material may be doped with electrically conductive particles. The one or more layers of reinforcement material may include at least two layers of fibrous reinforcement material stacked in a z-direction. The matrix material may be made of a dielectric material. A majority of the electrically conductive particles may be made of a paramagnetic material, such as aluminum or lithium.

In some embodiments, the reinforcement material penetrated with the doped viscous matrix material may be provided by heating pre-preg (e.g., in a manner similar to step 710 of method 700). In other embodiments, the reinforcement material penetrated with the doped viscous matrix material may be provided via transfer resin molding (e.g., in a manner similar to steps 802, 804, 806, 808 of method 800).

At step 904, a magnetic field may be applied to arrange the particles into one or more electrically conductive pathways. The applied magnetic field may cause a plurality of the particles to chain together to form at least one of the electrically conductive pathways. For example, the at least one electrically conductive pathway may be characterized by the plurality of particles being electrically interconnected. In some embodiments, the matrix material may be moderately electrically conductive, in which case the plurality of particles may be electrically interconnected via the matrix material.

In some embodiments, applying the magnetic field may include generating the magnetic field by at least a pair of solenoids disposed opposite one another relative to the one or more layers of reinforcement material. The generated magnetic field may have field lines that are generally parallel to the z-direction and extend through the at least two layers of fibrous reinforcement material.

In some embodiments, step 904 may involve applying the magnetic field until the matrix material reaches a predetermined viscosity. For example, application of the magnetic field may be applied when the matrix material has a relatively low viscosity level, thereby permitting the particles to arrange generally along the field lines and form the electrically conductive pathways. The viscosity of the matrix material may then be increased by a viscosity control device (e.g., a cure device) to a predetermined relatively high viscosity level, thereby substantially preventing the particles from dispersing. By applying the magnetic field until (or at least until) the matrix material reaches the predetermined relatively high viscosity level, discontinuities in the pathways may be minimized, thereby further improving electrically conductivity in the desired direction.

At step 906, the matrix material may be cured to a substantially cured state to substantially secure the one or more electrically conductive pathways in position relative to the one or more layers of reinforcement material. For example, step 906 may involve applying thermal energy to the matrix material to perform a cure cycle.

In some embodiments, steps 904, 906 may be at least partially performed concurrently. For example, the magnetic field may be applied until (or at least until) the matrix material is cured to the cured state. In particular, the above described predetermined relatively high viscosity level may correspond to the cured state of the matrix material.

Method 900 may further include a step of removing the magnetic field after curing the matrix material to the cured state. For example, after the matrix material reaches the cured state, the magnetic field may be removed by reducing electrical current flowing through the solenoids, by removing the composite material (e.g., formed by the reinforcement material, particles, and cured matrix material) from a vicinity proximal the solenoids, and/or by removing the solenoids from a vicinity proximal the composite material.

Example 6

This example describes a method for manufacturing a composite material; see FIG. 10.

FIG. 10 is a flowchart illustrating steps performed in an illustrative method, and may not recite the complete process or all steps of the program. FIG. 10 depicts multiple steps of a method, generally indicated at 1000. Although various steps of method 1000 are described below and depicted in FIG. 10, the steps need not necessarily all be performed, and in some cases may be performed in a different order than the order shown.

At step 1002, a configuration may be provided. The configuration may include a plurality of layers of reinforcement material and viscous matrix material penetrating the plurality of layers of reinforcement material. The matrix material may be doped with electrically conductive particles. The plurality of layers of reinforcement material may be stacked on top of one another in a z-direction. The particles may be made of a paramagnetic material. The reinforcement material may include a plurality of discrete fibers (e.g., carbon fibers) spaced apart from one another. The matrix material may be a resin.

At step 1004, a magnetic field may be applied to the configuration to arrange the particles with respect to the z-direction to form one or more electrically conductive pathways extending generally in the z-direction. For example, step 1004 may involve electrically interconnecting a first subset of the particles into a first pathway. The first pathway may extend between two or more of the discrete spaced apart fibers and through at least a majority of an overall thickness of the plurality of layers of the reinforcement material in the z-direction. Further, step 1004 may involve electrically interconnecting a second subset of the particles into a second pathway. The second pathway may be disposed in the resin, extend through the entire overall thickness, and be displaced from the first pathway in a direction orthogonal to the z-direction.

At step 1006, the matrix material may be cured to substantially secure the pathways in position relative to the matrix material and the plurality of layers of reinforcement material. In some embodiments, step 1004 may be carried out until the matrix material (e.g., resin) is cured to a predetermined cure state in step 1006.

Example 7

This example describes a data processing system 1100 in accordance with aspects of the present disclosure; see FIG. 11.

In this illustrative example, data processing system 1100 includes communications framework 1102. Communications framework 1102 provides communications between processor unit 1104, memory 1106, persistent storage 908, communications unit 1110, input/output (I/O) unit 1112, and display 1114. Memory 1106, persistent storage 1108, communications unit 1110, input/output (I/O) unit 1112, and display 1114 are examples of resources accessible by processor unit 1104 via communications framework 1102.

Processor unit 1104 serves to run instructions of software that may be loaded into memory 1106. Processor unit 1104 may be a number of processors, a multi-processor core, or some other type of processor, depending on the particular implementation. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and other suitable information either on a temporary basis or a permanent basis.

Storage devices 1116 also may be referred to as computer readable storage devices in these examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output (I/O) unit 1112 allows for input and output of data with other devices that may be connected to data processing system 1100. For example, input/output (I/O) unit 1112 may provide a connection for user input through a keyboard, a mouse, and/or some other suitable input device. Further, input/output (I/O) unit 1112 may send output to a printer. Display 1114 provides a mechanism to display information to a user.

Instructions for the operating system, applications, and/or programs may be located in storage devices 1116, which are in communication with processor unit 1104 through communications framework 1102. In these illustrative examples, the instructions are in a functional form on persistent storage 1108. These instructions may be loaded into memory 1106 for execution by processor unit 1104. The processes of the different embodiments may be performed by processor unit 1104 using computer-implemented instructions, which may be located in a memory, such as memory 1106.

These instructions are referred to as program instructions, program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126.

Computer readable storage media 1124 may include, for example, an optical or magnetic disk that is inserted or placed into a drive or other device that is part of persistent storage 1108 for transfer onto a storage device, such as a hard drive, that is part of persistent storage 1108. Computer readable storage media 1124 also may take the form of a persistent storage, such as a hard drive, a thumb drive, or a flash memory, that is connected to data processing system 1100. In some instances, computer readable storage media 1124 may not be removable from data processing system 1100.

In these examples, computer readable storage media 1124 is a physical or tangible storage device used to store program code 1118 rather than a medium that propagates or transmits program code 1118. Computer readable storage media 1124 is also referred to as a computer readable tangible storage device or a computer readable physical storage device. In other words, computer readable storage media 1124 is a media that can be touched by a person.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for data processing system 1100 are not meant to provide architectural limitations to the manner in which different embodiments may be implemented. The different illustrative embodiments may be implemented in a data processing system including components in addition to and/or in place of those illustrated for data processing system 1100. Other components shown in FIG. 11 can be varied from the illustrative examples shown. The different embodiments may be implemented using any hardware device or system capable of running program code. As one example, data processing system 1100 may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 1118 may be omitted, because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

In another example, a bus system may be used to implement communications framework 1102 and may be comprised of one or more buses, such as a system bus or an input/output bus. Of course, the bus system may be implemented using any suitable type of architecture that provides for a transfer of data between different components or devices attached to the bus system.

Additionally, communications unit 1110 may include a number of devices that transmit data, receive data, or both transmit and receive data. Communications unit 1110 may be, for example, a modem or a network adapter, two network adapters, or some combination thereof. Further, a memory may be, for example, memory 1106, or a cache, such as that found in an interface and memory controller hub that may be present in communications framework 1102.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Example 8

This section describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A composite material comprising one or more layers of reinforcement material each having a thickness in a z-direction; matrix material penetrating the one or more layers of reinforcement material; and a plurality of electrically conductive particles disposed (or dispersed) in the matrix material and non-randomly arranged to provide enhanced conductivity in the z-direction.

A1. The composite material of paragraph A0, wherein a substantial percentage of the particles form one or more electrically conductive chains extending generally in the z-direction, each chain including at least two or more of the particles in electrical contact with one another.

A2. The composite material of paragraph A1, wherein the substantial percentage is more than 50%.

A3. The composite material of paragraph A0, wherein the particles are made of a paramagnetic material, and at least one of the chains extends through a gap between adjacent fibers included in one of the layers.

A4. The composite material of paragraph A3, wherein a majority of the particles each have a length that is less than a width of the gap.

A5. The composite material of paragraph A4, wherein each particle has a respective aspect ratio greater than 1, with the aspect ratio being defined as the length of the respective particle divided by another dimension of the respective particle orthogonal to the length of the respective particle.

A6. The composite material of paragraph A0, wherein the one or more layers includes stacked layers of carbon fibers.

B0. A method of manufacturing a composite material, the method comprising providing one or more layers of reinforcement material penetrated with viscous matrix material that is doped with electrically conductive particles; applying a magnetic field to arrange the particles into one or more electrically conductive pathways; and curing the matrix material to a substantially cured state to secure the one or more electrically conductive pathways in position relative to the one or more layers of reinforcement material.

B1. The method of paragraph B0, further comprising removing the magnetic field after curing the matrix material to the substantially cured state.

B2. The method of paragraph B0, wherein applying the magnetic field includes generating the magnetic field by at least a pair of solenoids disposed opposite one another relative to the one or more layers of reinforcement material.

B3. The method of paragraph B0, wherein the one or more layers includes at least two layers of fibrous reinforcement material stacked in a z-direction, and the applying step involves generating the magnetic field such that field lines of the magnetic field are generally parallel to the z-direction and extend through the at least two layers of fibrous reinforcement material.

B4. The method of paragraph B0, wherein a majority of the particles are made of a paramagnetic material, and the applying step causes a plurality of the particles to chain together to form at least one of the electrically conductive pathways.

B5. The method of paragraph B0, wherein the matrix material is made of a dielectric material, and the applying step arranges a plurality of the particles into at least one electrically conductive pathway characterized by the plurality of the particles being electrically interconnected.

B6. The method of paragraph B0, wherein the curing step involves applying thermal energy to the matrix material.

B7. The method of paragraph B0, wherein the applying step and the curing step are at least partially performed concurrently.

B8. The method of paragraph B0, wherein the applying step involves applying the magnetic field until the matrix material reaches a predetermined viscosity.

C0. A method of manufacturing a composite material, the method comprising providing a configuration including a plurality of layers of reinforcement material and viscous matrix material penetrating the plurality of layers of reinforcement material, the matrix material being doped with electrically conductive particles, the plurality of layers of reinforcement material being stacked on top of one another in a z-direction; applying a magnetic field to the configuration to arrange the particles with respect to the z-direction to form one or more electrically conductive pathways extending generally in the z-direction; and curing the matrix material to substantially secure the one or more electrically conductive pathways in position relative to the matrix material and the plurality of layers of reinforcement material.

C1. The method of paragraph C0, wherein the particles are made of a paramagnetic material and the reinforcement material includes a plurality of discrete fibers that are spaced apart from one another, the applying step electrically interconnecting a first subset of the particles into a first pathway of the one or more electrically conductive pathways, the first pathway extending between two or more of the discrete spaced apart fibers and through at least a majority of an overall thickness of the plurality of layers of the reinforcement material in the z-direction.

C2. The method of paragraph C1, wherein the matrix material is a resin, and the applying step involves electrically interconnecting a second subset of the particles into a second pathway of the one or more electrically conductive pathways, the second pathway being disposed in the resin, extending through the entire overall thickness, and being displaced from the first pathway in a direction orthogonal to the z-direction.

C3. The method of paragraph C2, wherein the applying step is carried out until the resin is cured to a predetermined cure state in the curing step.

Advantages, Features, Benefits

The different embodiments of the composite materials and methods of manufacture thereof described herein provide several advantages over known solutions for enhancing electrical conductivity. For example, the illustrative embodiments described herein may allow for conductive pathways to be formed in (and/or through) a composite material as the composite material is being cured without compromising an integrity of the composite material. Additionally, and among other benefits, illustrative embodiments described herein may allow for dissipation of electrical current incident on a composite material, and/or enhanced electrical current flow through one or more composite layers. However, not all embodiments described herein provide the same advantages or the same degree of advantage.

Conclusion

The disclosure set forth above may encompass multiple distinct embodiments with independent utility. Although each of these embodiments has been disclosed in its preferred form(s), the specific embodiments thereof as disclosed and illustrated herein are not to be considered in a limiting sense, because numerous variations are possible. The subject matter of the embodiments includes all novel and nonobvious combinations and subcombinations of the various elements, features, functions, and/or properties disclosed herein. The following claims particularly point out certain combinations and subcombinations regarded as novel and nonobvious. Embodiments of other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the embodiments of the present disclosure.

What is claimed is:

1. A method of manufacturing a composite material, the method comprising:
   providing a configuration including a plurality of separate distinguishable layers of reinforcement material, each layer comprising a plurality of elongate fibers oriented in parallel, and viscous matrix material penetrating the plurality of layers of reinforcement material, the matrix material being doped with electrically conductive particles, the plurality of layers of reinforcement material being stacked on top of one another in a z-direction;
   applying a magnetic field to the configuration to arrange the particles with respect to the z-direction to form one or more electrically conductive pathways extending generally in the z-direction through the plurality of separate distinguishable layers of reinforcement material; and
   curing the matrix material to secure the one or more electrically conductive pathways in position relative to the matrix material and the plurality of layers of reinforcement material.

2. The method of claim 1, wherein the particles are made of a paramagnetic material, the applying step electrically interconnecting a first subset of the particles into a first pathway of the one or more electrically conductive pathways, the first pathway extending between two or more of the plurality of elongate fibers and through at least a majority of an overall thickness of the plurality of layers of the reinforcement material in the z-direction.

3. The method of claim 2, wherein the matrix material is a resin, and the applying step involves electrically interconnecting a second subset of the particles into a second pathway of the one or more electrically conductive pathways, the second pathway being disposed in the resin, extending through the entire overall thickness, and being displaced from the first pathway in a direction orthogonal to the z-direction.

4. The method of claim 3, wherein the applying step is carried out until the resin is cured to a predetermined cure state in the curing step.

5. A method of manufacturing a composite material, the method comprising:
   providing one or more layers of reinforcement material penetrated with viscous matrix material that is doped with electrically conductive particles, with each of the one or more layers of reinforcement material including a majority of fibers oriented parallel to one another;
   applying a magnetic field to arrange the particles into one or more electrically conductive pathways; and
   curing the matrix material to a cured state to secure the one or more electrically conductive pathways in position relative to the one or more layers of reinforcement material.

6. The method of claim 5, further comprising removing the magnetic field after curing the matrix material to the cured state.

7. The method of claim 5, wherein applying the magnetic field includes generating the magnetic field by at least a pair of solenoids disposed opposite one another relative to the one or more layers of reinforcement material.

8. The method of claim 5, wherein the one or more layers includes at least two layers of fibrous reinforcement material stacked in a z-direction, and the applying step involves generating the magnetic field such that field lines of the magnetic field are generally parallel to the z-direction and extend through the at least two layers of fibrous reinforcement material.

9. The method of claim 5, wherein a majority of the particles are made of a paramagnetic material, and the applying step causes a plurality of the particles to chain together to form at least one of the electrically conductive pathways.

10. The method of claim 5, wherein the matrix material is made of a dielectric material, and the applying step arranges a plurality of the particles into at least one electrically conductive pathway characterized by the plurality of the particles being electrically interconnected.

11. The method of claim 5, wherein the curing step involves applying thermal energy to the matrix material.

12. The method of claim 5, wherein the applying step and the curing step are at least partially performed concurrently.

13. The method of claim 5, wherein the applying step involves applying the magnetic field until the matrix material reaches a predetermined viscosity.

14. The method of claim 1, wherein
the plurality of layers of reinforcement material each have a thickness in the z-direction
and curing the matrix material includes securing the electrically conductive particles disposed in the matrix material into a non-randomly arranged position to provide enhanced conductivity in the z-direction.

15. The method of claim 14, wherein a substantial percentage of the secured particles form one or more electrically conductive chains extending generally in the z-direction, each chain including at least two or more of the particles in electrical contact with one another.

16. The method of claim 15, wherein the substantial percentage is more than 50%.

17. The method of claim 15, wherein the particles are made of a paramagnetic material, and at least one of the chains extends through a gap between adjacent fibers included in one of the layers.

18. The method of claim 17, wherein a majority of the particles each have a length that is less than a width of the gap.

19. The method of claim 18, wherein each particle has a respective aspect ratio greater than 1, with the aspect ratio being defined as the length of the respective particle divided by another dimension of the respective particle orthogonal to the length of the respective particle.

20. The method of claim 14, wherein the plurality of layers includes stacked layers of carbon fibers.

* * * * *